(12) United States Patent  
Filho (10) Patent No.: US 7,581,209 B2  
(45) Date of Patent: Aug. 25, 2009

(54) METHOD FOR DETERMINING CODE COVERAGE

(75) Inventor: Wedson Almeida Filho, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 774 days.

(21) Appl. No.: 11/069,148

(22) Filed: Feb. 28, 2005

(65) Prior Publication Data

US 2006/0195724 A1 Aug. 31, 2006

(51) Int. Cl.  
*G06F 9/44* (2006.01)

(52) U.S. Cl. .......................... 717/129; 717/127; 714/35

(58) Field of Classification Search ........................ None  
See application file for complete search history.

(56) References Cited

U.S. PATENT DOCUMENTS 6,543,049 B1 * 4/2003 Bates et al. ................. 717/129  
2002/0087956 A1 * 7/2002 Darlet ........................ 717/159  
2005/0060689 A1 * 3/2005 Bates et al. ................. 717/125  
2006/0101419 A1 * 5/2006 Babcock ..................... 717/130

OTHER PUBLICATIONS

Tikir et al. Effiecient Instrumentation for Code Coverage Testing, International Symposium on Software Testing and Analysis, 2002 ACM Proceedings, pp. 86-96. [retrieved on Jun. 5, 2009] Retrieved from the Internet: URL<http://delivery.acm.org/10.1145/570000/566186/p86-tikir.pdf?key1=566186&key2=2907324421&coll=portal&dl=ACM&CFID=39242560&CFTOKEN.*  
Code Coverage Analysis, by Steve Cornett, Bullseye Testing Technology, Jul. 29, 2004, 10 pp.  
Software Testing Tools, by Bill Schroeder, Jan. 22, 1998, 8 pp.

* cited by examiner

*Primary Examiner*—Tuan Q Dam  
*Assistant Examiner*—Cheneca P Smith  
(74) *Attorney, Agent, or Firm*—Wolf, Greenfield & Sacks, P.C.

(57) ABSTRACT

A method and system for determining code coverage of one or more software modules is disclosed. The disclosed method and system uses an enumeration module, a code coverage module and an analysis module. The enumeration module is used to identify portions of the code in the software module for which code coverage data is desired. The code coverage module collects code coverage data when the software module is loaded. The analysis module summarizes and reports results of the collected code coverage data.

20 Claims, 8 Drawing Sheets

Foo.exe

| Baseless Addr. | Location and File | Line No. | Function Name |
|---|---|---|---|
| 000070A8 | c:\foo\print.c | 312 | Print |
| 000054FE | c:\foo\file.c | 661 | LoadFile |
| | | | |
| | | | |

| .Foo.exe | | | | | |
|---|---|---|---|---|---|
| Baseless Addr. | Location and File | Line No. | Function Name | Hit | |
| 000070A8 | c:\foo\print.c | 312 | Print | Y | |
| 000054FE | c:\foo\file.c | 661 | LoadFile | N | |
| | | | | | |
| | | | | | |

214 ↙
502 — .Foo.exe
504 — 000070A8 row
506 — 000054FE row

METHOD FOR DETERMINING CODE COVERAGE

TECHNICAL FIELD

This invention generally relates to computer systems. More particularly, this invention relates to a method for determining code coverage.

BACKGROUND OF THE INVENTION

"Code coverage" or "test coverage" is a measure of the amount of code in a software program or module that is executed when the software is tested. The higher the code coverage, the greater the likelihood that any errors in the software program or module will be detected during the test. Thus, it is important for software developers to be able to determine code coverage as it provides a metric as to whether the software has been sufficiently tested.

Known methods exist for determining the code coverage. Such known methods generally require "instrumentation" of the code before it is subject to testing. Instrumentation refers to a process whereby probes are added to the software to be tested. The probes are code, which are added to either the source code or the compiled code, to call another program that measures code coverage.

Methods for determining code coverage that require instrumentation of the source code have disadvantages. For example, such methods are dependent on the particular programming language used to generate the source code. Additionally, instrumentation of the source code is cumbersome and is itself a process that is prone to generating errors in the code. Further, if the source code is unavailable, determination of the code coverage is generally not possible using such methods.

Moreover, some methods for determining code coverage collect statistics on the entire software module under test including portions of the module, such as standard C++ libraries, that are not of interest. Some methods also execute the code coverage method on portions of the code of interest even if coverage of those portions has previously been determined. These code coverage methods unnecessarily impact the performance of the software under test as there is inherent resource overhead in measuring code coverage.

SUMMARY OF THE INVENTION

The present invention provides an improved method and system for determining code coverage. In an embodiment of the invention, lines of code in a software module for which code coverage data is desired are enumerated in symbols data. When the software module is loaded, each line of code for which code coverage data is desired is modified by replacing a portion of an instruction therein with a breakpoint. The software is executed and, each time a breakpoint is encountered, the corresponding code is identified as executed and the portion of the instruction is reinserted into the code.

The method and system of the present invention provides a way of determining code coverage that is suitable for use with non-instrumented binary files and that allows code coverage to be limited to only certain portions of the software module. Additionally, code coverage for a given line of code need only be done once thereby minimizing the impact on performance that occurs as a result of code coverage determination. Further, the method of the present invention is suitable for use with any binary file, regardless of the number of bits that are used for the instruction set.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

A method and system for determining code coverage of one or more software modules during execution will now be described with respect to certain embodiments. The method and system determines code coverage on a binary file without the need for a source file or instrumentation of the software to be tested.

Turning to the drawings, wherein like reference numerals refer to like elements, the invention is illustrated as being implemented in a suitable computing environment.

Figure 1:
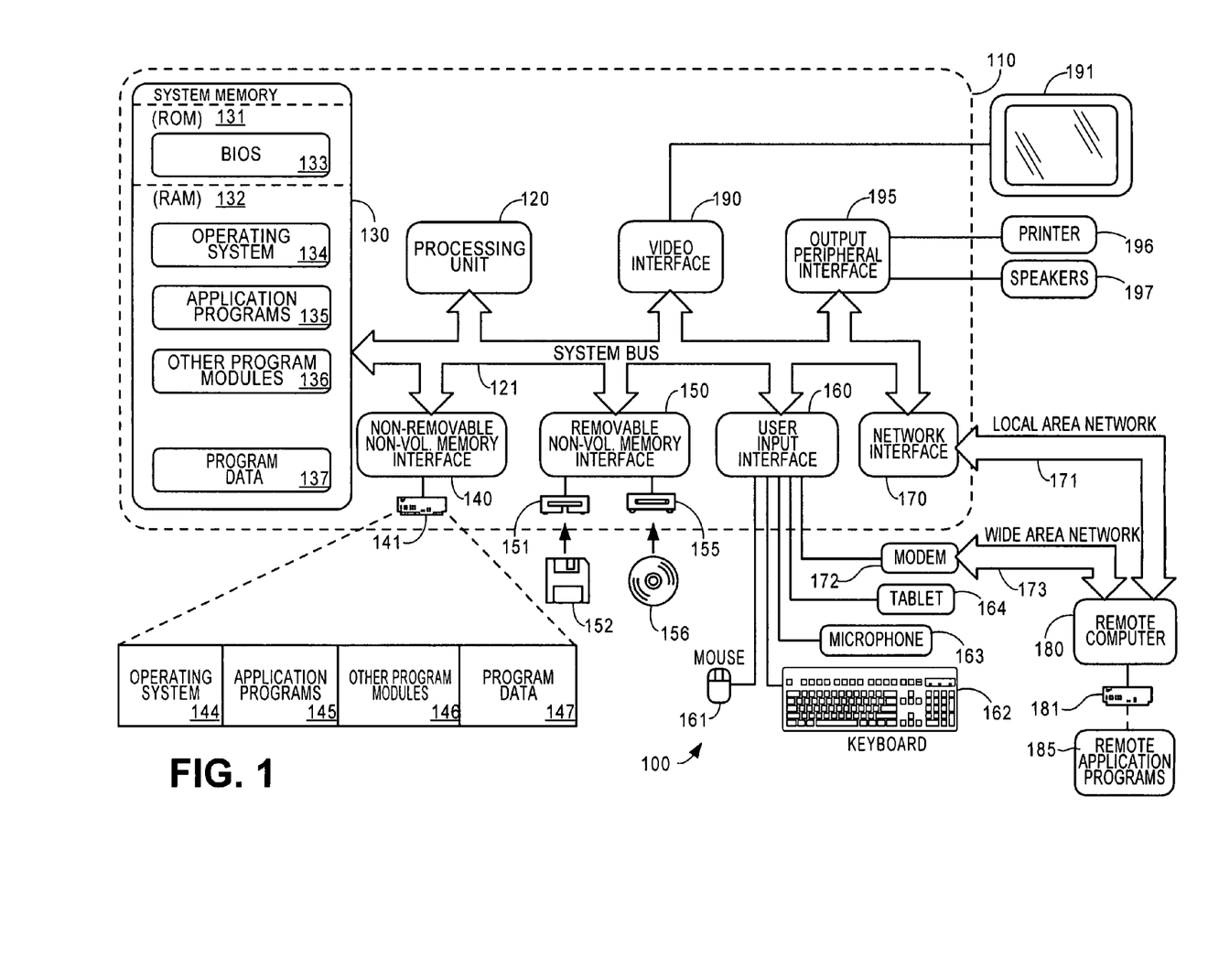
FIG. 1 is a block diagram generally illustrating an exemplary computer system that may be used to carry out the methods of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
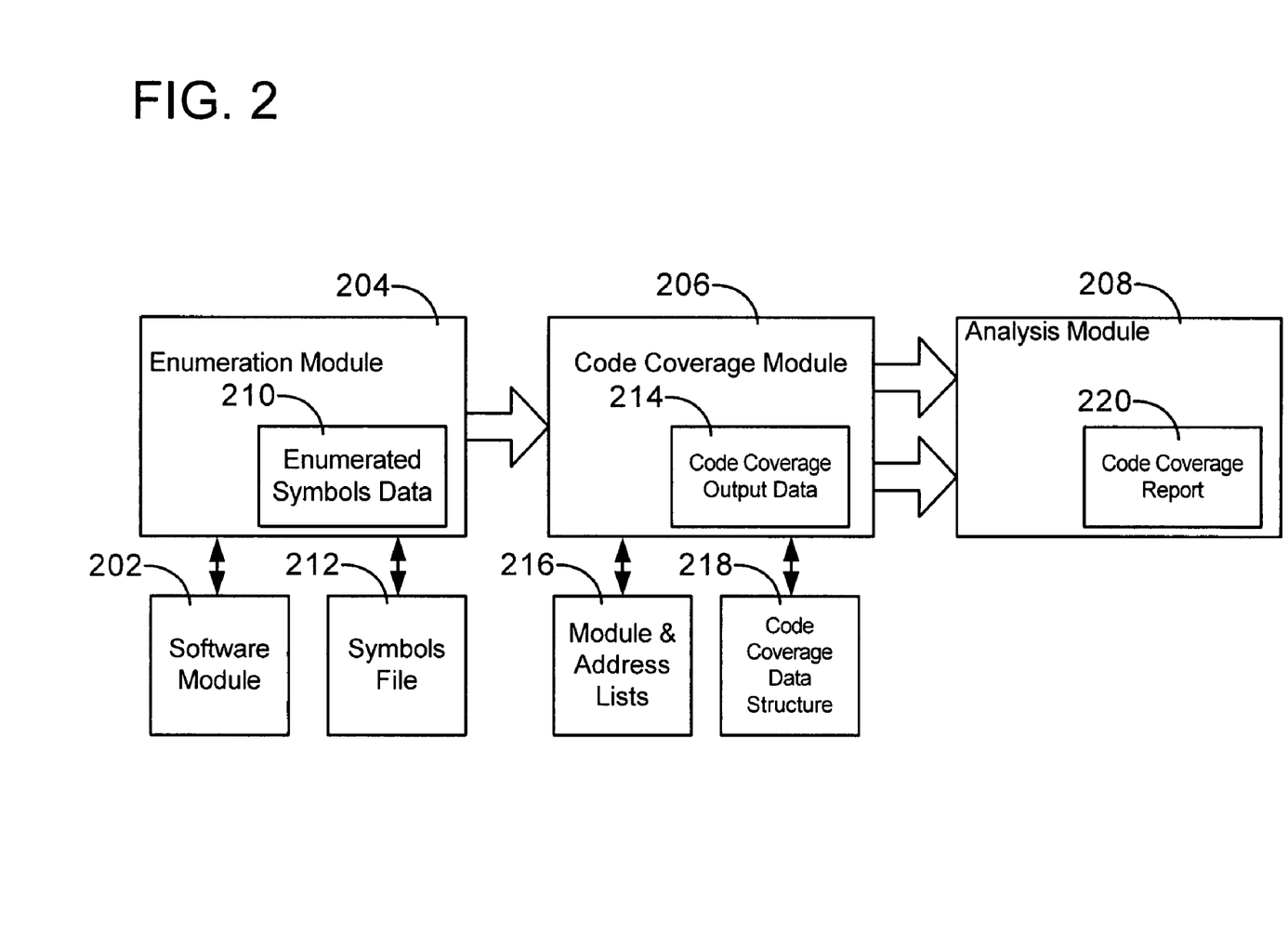
FIG. 2 is a functional block diagram generally illustrating a method and system for carrying out the present invention.

FIG. 2 illustrates a functional block diagram of an embodiment of the method and system of the present invention. The invention provides a way to determine the code coverage during execution of a software module 202. The execution of the software module 202 occurs, for example, while the software module 202 is subjected to a test sequence.

The software module 202 is any suitable code that is capable of being executed, either alone or in conjunction with other software modules, on a computer, such as the computer 110 described with reference to FIG. 1. By way of example and not limitation, the software module is a binary file, examples of which include executable files, dynamic link library files, and system files.

In an embodiment, the invention is carried out using an enumeration module 204, a code coverage module 206, and an analysis module 208. However, as will become apparent in the description that follows, only the code coverage module 206 is required to collect code coverage data according to the present invention. Further, it will be understood that, although the enumeration module 204, the code coverage module 206, and the analysis module 208 are shown as separate modules, they may form a single module or program. The enumeration module 204, code coverage module 206, and analysis module may form part of the operating system 134 (FIG. 1) and execute in either user mode or kernel mode or, alternatively, are implemented as one or more application programs that execute outside of the operating system.

The enumeration module 204 is used to implement an enumeration phase wherein enumerated symbols data 210 is generated. The enumerated symbols data 210 identifies one or more modules and code within each module for which code coverage information is desired. A specific example of enumerated symbol data 210 is shown and described with reference to FIG. 3.

The enumeration module 204 generates the enumerated symbols data by searching software modules and code within those modules that match a set of criteria or filters entered by a user. Examples of such filters are, by way of example and not limitation, to include or exclude certain paths and/or file names, to include or exclude all or certain functions with a software module, and to include or exclude certain lines of code within a software module. The ability to search for files and data within files that match filters is known and, accordingly, not described in detail herein.

The enumeration module 204 may use symbols file 212 to create the enumerated symbols data 210. The symbols file provides certain information concerning the binary software module 202, such as the source file, line number and function name that correspond to lines of code of the software module 202. Symbols files are known, examples of which include files having a ".pdb" extension. It will be understood that while the symbols file 212 is useful for carrying out certain embodiments of the present invention, it is not required.

The foregoing description of the enumeration module 204 is provided as an example of way to create the enumerated symbols data 210. The enumeration module 204 is not a required component of the present invention. For example, in lieu of the enumeration module 204, the enumerated symbol data 210 may be manually entered and stored in a text file.

The enumeration module 204 may be executed multiple times to create a plurality of enumerated symbol data sets. Such multiple data sets can then be linked together to create enumeration symbols data 210 that identifies multiple modules and corresponding code for which coverage data is desired.

The code coverage module 206 collects code coverage data while the software module 202 executes. The code coverage module 206 takes the enumerated symbols data 210 as input and generates module and address lists 216 that identifies the modules and corresponding code from each module for which code coverage is desired. For each address identified in the module and address lists 216, the code coverage module maintains a code coverage data structure 218 that identifies whether an instruction at that address has been executed. An example of the module and address lists 216 and code coverage data structure 218 is shown and described with reference to FIG. 4.

The code coverage module 206 also generates code coverage output data 214, which is similar to the enumerated symbols data 210 except that it also identifies whether or not each address was executed. An example of the code coverage output data 214 is described with reference to FIG. 5.

The analysis module 208 is optionally provided to summarize and enhance the code coverage output data 214. It provides, for example, a code coverage report 220. The code coverage report 220 includes, by way of example and not limitation, a list of functions and percentage of code within those functions that was executed based upon the code coverage output data 214. An example of a code coverage report 220 is provided in Table 1 below.

Having provided an overview of the present invention, a more detailed description of the data components and methods used by the present invention will now be described with respect to certain embodiments. It will be understood, however, that the following embodiments are exemplary and are not intended to limit the scope of the invention claimed herein.

Figure 3:
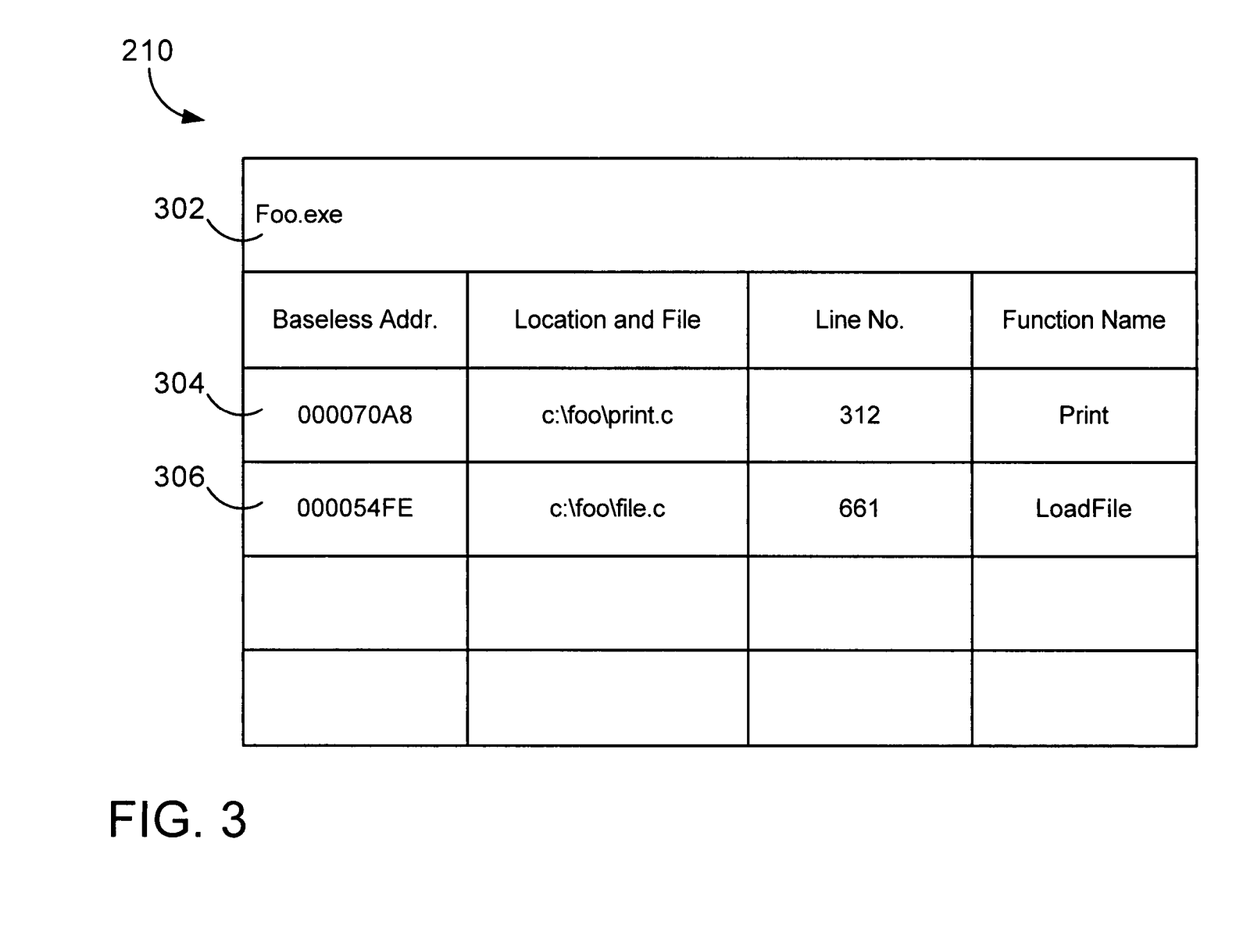
FIG. 3 is a block diagram illustrating an example of data representing a list of enumerated symbols for a software module.

Referring to FIG. 3, an example of the enumerated symbols data 210 will now be described. A first entry 302 includes the name of the module for which code coverage data is desired. In the example, the name of the module is "Foo.exe."

The enumerated symbols data 210 also includes a list, i.e. one or more entries, which identifies the portions of the code from module "Foo.exe" for which the code coverage data is desired. As shown, each entry below the module name includes a baseless address, a location and file name, a line number, and a function name.

The address is a baseless address, i.e. a memory location where the corresponding code would reside in memory if the module was loaded into memory beginning at address zero. The remaining information for each entry corresponds to a source file that was used to create the software module 202. This information includes the path (e.g. directory and subdirectory) and file name of the source code, line number in the source code that corresponds to the code at the designated baseless address, and the name of the corresponding function. The location and file name, line number and function name data is extracted from the symbols file 212.

As a specific example, entry 304 identifies a particular line of code for which coverage data is desired. The baseless address 000070A8 is the address the particular line of code would reside if the module Foo.exe was loaded beginning at memory address zero. The source file used to generate the particular line of code is "print.c," which is located in directory "c:\foo" and the line in print.c that corresponds the particular code is line 312. The name of the function in the source code that corresponds to the particular code is "Print."

As a second example, entry 306 identifies code having a baseless address 000054FE, which again is the address the particular line of code would reside if the module foo.exe was loaded beginning at memory address zero. The source file used to generate the particular line of code is "file.c," which is located in directory "c:\foo" and the line in file.c that corresponds the particular code is line 661. The name of the function in the source code that corresponds to the particular code is "LoadFile."

It will be understood that while only a limited number of entries are shown in FIG. 3, many such entries may be included. Further, as previously described, the enumerated symbols data 210 may include multiple modules with each module having a list of baseless addresses and other data. Additionally, the code coverage module 206 does not require all of the information described in the example described with reference to FIG. 3. The code coverage module 206 only requires the module name and baseless addresses to collect code coverage data. The location and filename, line number and function names are optionally provided.

Figure 4:
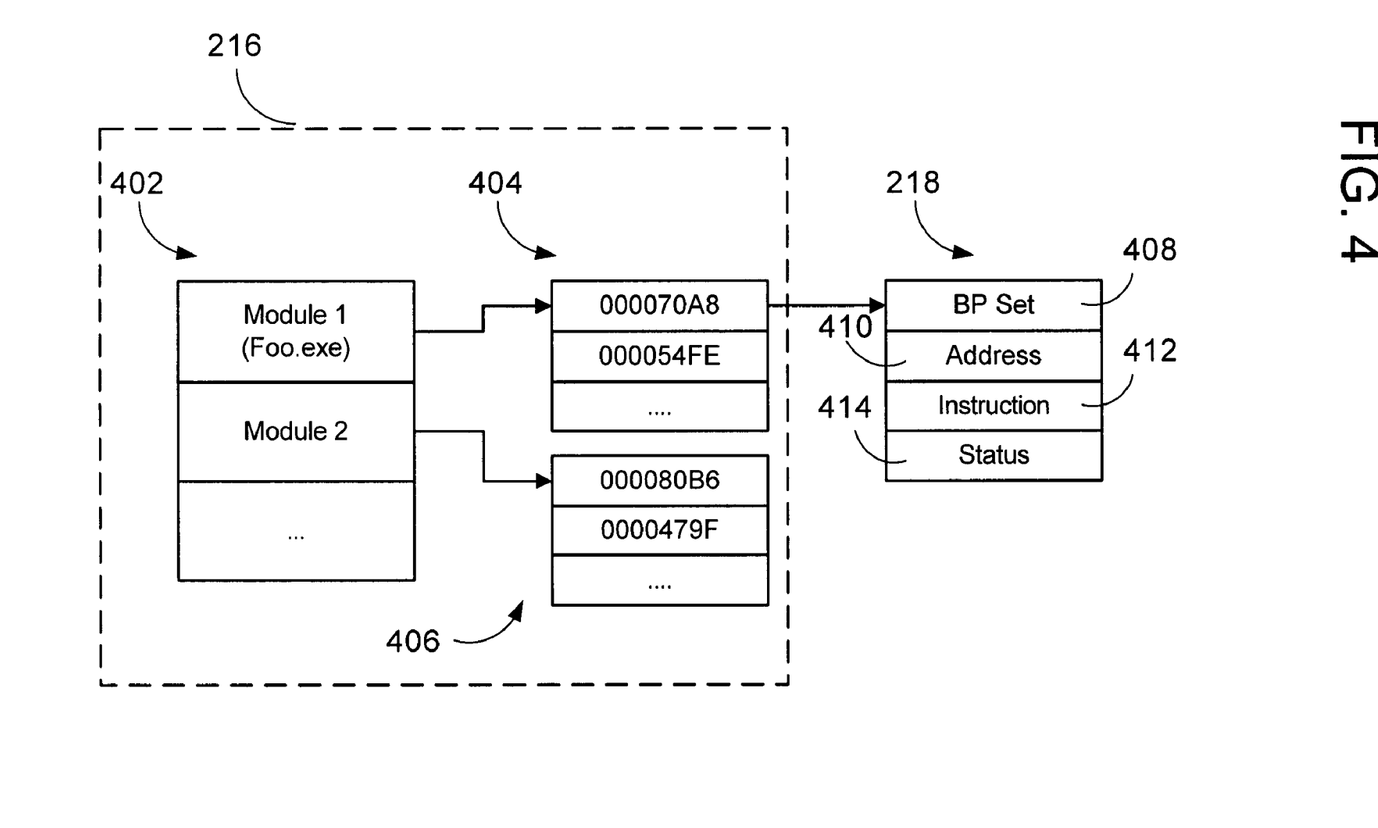
FIG. 4 is a block diagram illustrating an example of data structures that facilitate code coverage determination.

Referring to FIG. 4, an example of the module and address lists 216 and the code coverage data structure 218 will now be described.

The module and address lists 216 are generated by the code coverage module 206 when the code coverage module 206 is started. The address and module lists 216 include a list of modules 402 and for each module identified therein a corresponding list of addresses 404, 406. The list of modules 402 and corresponding list of addresses 404, 406 correspond to the modules and addresses that are provided in the enumerated symbols data 210.

In the example shown, the list of modules 402 is separate from the list of addresses 404, 406 and each module includes a pointer to the corresponding list of addresses. For example, the module foo.exe includes a pointer to addresses 404, which are addresses for which code coverage data is desired. Module 2 includes a pointer to a second set of addresses 406, which are addresses in Module 2 for which code collection data is desired.

As also shown in FIG. 4, each address of each module includes a corresponding code coverage data structure 218. The code coverage data structure 218 includes the following fields: BreakPoint (BP) Set 408, Address 410, Instruction 412, and Status 414. The function of each of these fields is described below.

The BP Set field 408 includes, for example, a Boolean value that identifies whether a breakpoint has been set for the code at the corresponding baseless address for the corresponding module. A breakpoint is set for the code at the baseless address when the corresponding module is loaded into memory. As described below, the breakpoint is unset when the corresponding module is unloaded.

The address field 410 provides a rebased address for the line of code that corresponds to baseless address. The rebased address is the actual address of the memory location where line of code resides when the software module 202 is loaded into memory.

The instruction field 412 is used to store the instruction or an n-bit portion of the instruction that is included in the code at the address identified in field 410. For example, the instruction field 412 may include the first byte from the line of code. The instruction may be any length, e.g. may be a 32 or 64-bit instruction.

The status field 414 is used to maintain code coverage information. For example, the status is a Boolean value that indicates whether the corresponding line of code has been executed.

It is emphasized that the foregoing data structure are provided by way of example as any suitable data structures can be used that permit tracking which lines of code in the software module are executed.

Figure 5:
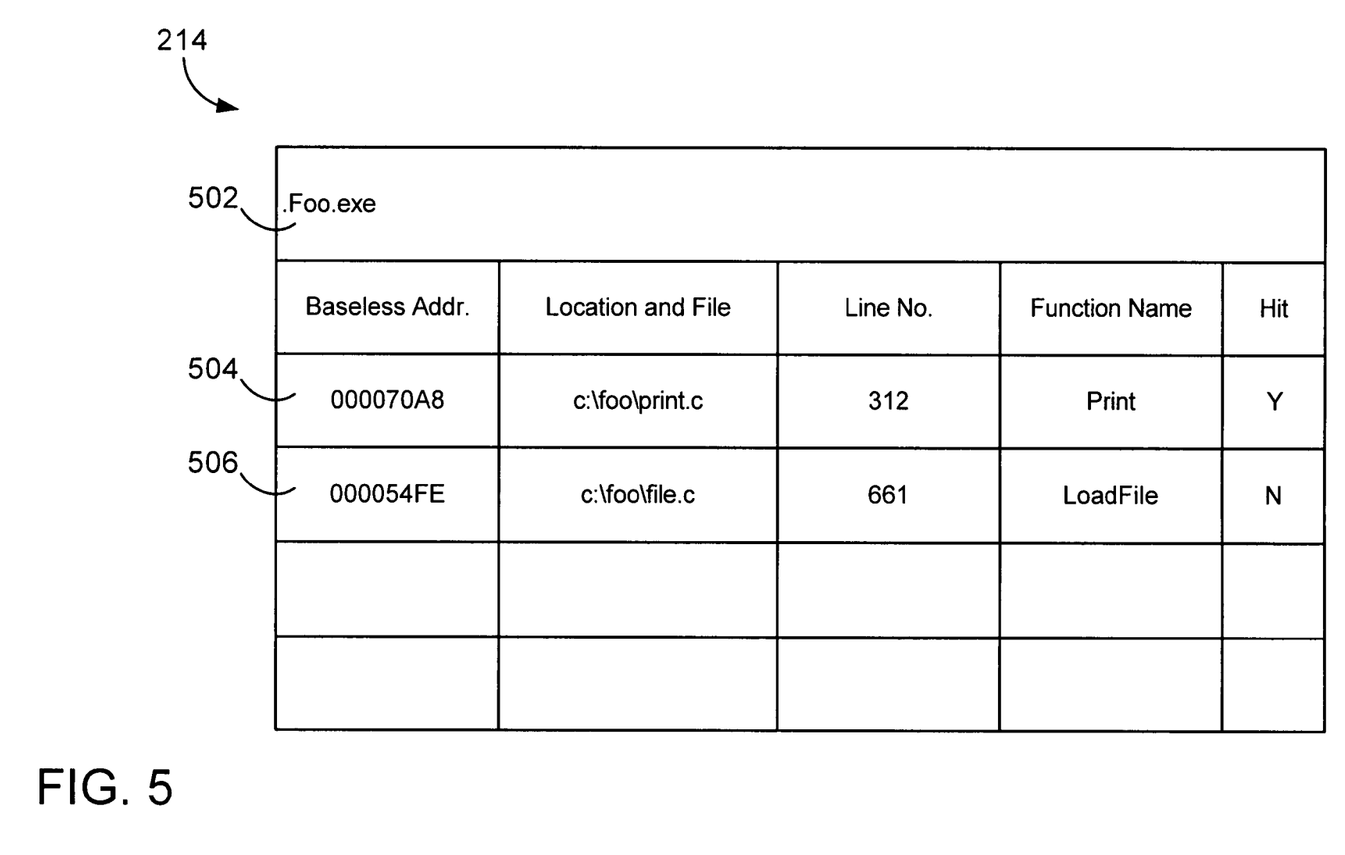
FIG. 5 is block diagram illustrating an example of an output data file generated by a code coverage module according to the present invention.

FIG. 5 illustrates an example the code coverage output data 214 that is generated by the code coverage module 206 when the collection of code coverage data is complete for one or more software modules.

As generally shown, the code coverage output data 214 includes identification of the software module at entry 502. The output file also includes entries 504, 506 which correspond to entries in the enumerated symbol data 210, i.e. the lines of code for which code coverage data was desired. As with the enumerated symbol data 210, each entry includes a baseless address and source file information such as location and file name of the source file, line number within the source and function name that correspond to the code at the specified baseless address. Only the module name and baseless addresses are required with the information concerning the source file being optional.

In addition, for each entry, data is provided that identifies whether the code was "hit." As used herein, the term hit means the code was executed or at least an attempt was made to execute the code that corresponds to the specified baseless address.

FIG. 6-FIG. 9 illustrate an example of methods used by the code coverage module 206 to obtain code coverage data for one or more software modules.

Figure 6:
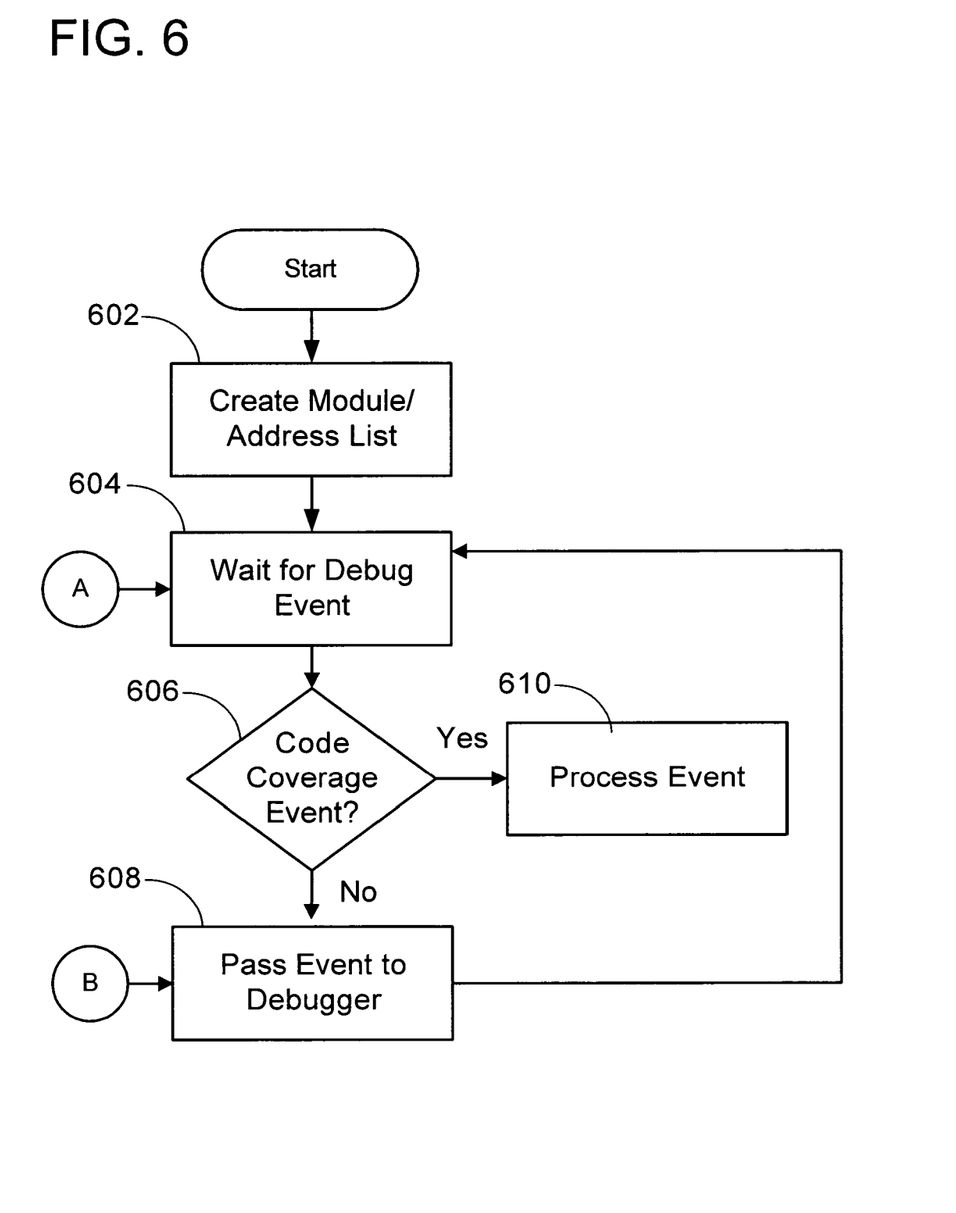
FIG. 6 is a flow diagram illustrating an example of a method used to collect code coverage data for a software module.

Referring to FIG. 6, in step 602, the code coverage module 206 creates the module and address lists 216. As previously described, the module and address lists 216 include data that identifies the modules and corresponding addresses within those modules for which code coverage data is desired. As also previously described, the data in the module and address lists 216 is derived from the enumerated symbols data 210.

After the module and address lists 216 are created, the code coverage module 216 waits for a debug event to occur as shown in step 604. When a debug event occurs, it is determined in step 604 whether the debug event is a code coverage event. Code coverage events include module load, module unload, and breakpoint, which are further described below.

Non-code coverage events include, for example, debug events that apply to a debugger attached to a target system or process. If the event is non-code coverage event, e.g. other debug event or the like, control is passed to the debugger as shown in step 608.

If the event is a code coverage event, further processing by code coverage module 606 is required as shown in step 610. The further processing depends upon the type of code coverage event as will now be described with reference to FIG. 7-FIG. 9.

Figure 7:
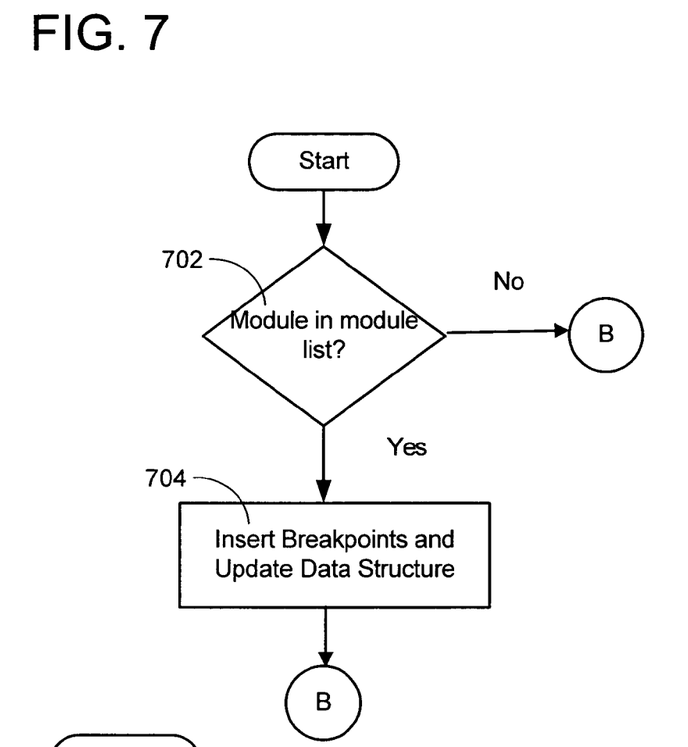
FIG. 7 is a flow diagram illustrating an example of a method used when a software module is loaded into memory.

FIG. 7 illustrates the steps taken by the code coverage module 206 if the code coverage event is the module load event. The module load event occurs when a software module is loaded into memory when the code coverage module 206 is executing.

As shown in step 702, it is determined whether the loaded module is identified in the module list 402 (FIG. 4). If the loaded module is not in the module list 402, the code coverage module 206 passes the event to the debugger as shown in step 608.

If, however, the loaded module is identified in the module list 402, in step 704, the code coverage data structure 218 is updated for each address specified for that module, e.g. addresses 404 or 406 as shown in FIG. 4. For each such address, the code coverage data structure 218 is updated by, for example, storing in field 410 the actual address where that line of code resides in memory. Additionally, for each address, the first n-bits of the line of code are stored in the instruction field 412. The code coverage module 206 also replaces the first n-bits of the code stored in memory with a breakpoint instruction, which can be any suitable designation. The function of the breakpoint is described below. After the data structure is updated, the event is passed to the debugger.

Figure 8:
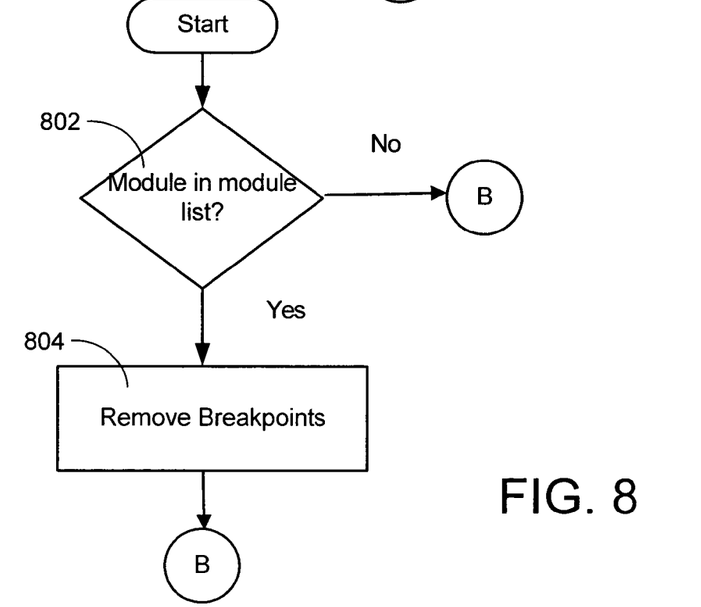
FIG. 8 is a flow diagram illustrating an example of method used when a software module is unloaded from memory.

FIG. 8 illustrates the steps taken by the code coverage module 206 if the code coverage event is the module unload event. The module unload event occurs when a software module is unloaded from memory while the code coverage module 206 is executing.

As show in step 802, it is determined whether the unloaded module is identified in the module list 402 (FIG. 4). If the unloaded module is not in the module list 402, the code coverage module 206 passes the event to the debugger as shown in step 608 (FIG. 6).

As shown in step 804, if the unloaded module is identified in the module list 402, code coverage data structures 218 for each of the addresses 404 that correspond to that module are updated. For example, the BP Set field is updated to reflect that the breakpoint is no longer set. Clearing the BP Set field 408 ensures that an address is not inadvertently marked as executed if another module is loaded into the memory space wherein the unloaded module resided. After the data structure is updated, the event is passed to the debugger.

Figure 9:
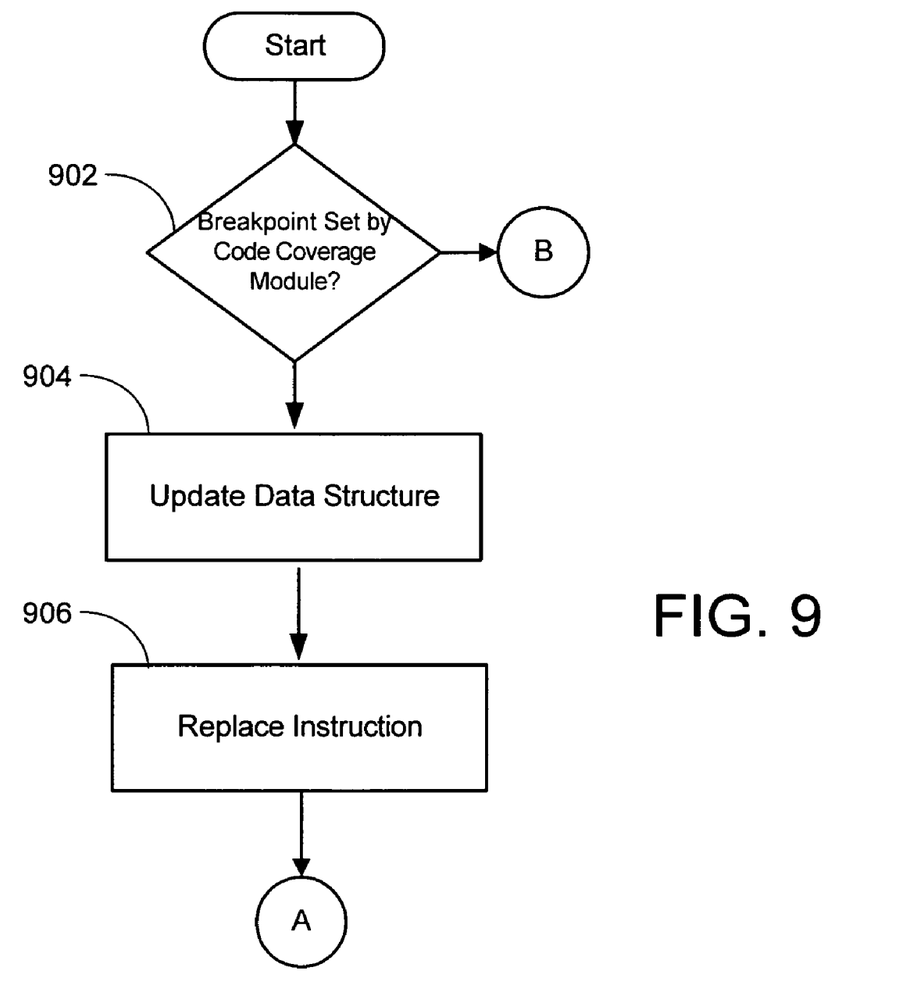
FIG. 9 is a flow diagram illustrating an example of a method used when a breakpoint is encountered in an executing software module.

FIG. 9 illustrates the steps taken by the code coverage module 206 if the code coverage event is the breakpoint event. The breakpoint event occurs when the loaded software module is executing and a line of code having a breakpoint inserted therein is encountered.

When the breakpoint is encountered, it is first determined in step 902 whether the breakpoint was set by the code coverage module 206. If the breakpoint was not set by the code coverage module 206, the event is passed to the debugger. If the breakpoint was set by the coverage module 206, the process proceeds to step 904.

In step 904, the code coverage data structure 218 is updated. The address of the line of code having the breakpoint is compared against the address fields 410 of the code coverage data structure 218 to locate the portion of the structure that corresponds to that line of code, i.e. the portion of the data structure that has the same address value in address field 410. Once the portion of the structure is located, the Status field 414 is set to identify that portion of the code as "hit." The instruction or portion thereof is then copied from field 412 and reinserted into the line of code and that line of code is then executed as shown in step 906. The process then returns to step 604 where it waits for the next debug event to occur. If, in step 904, the address of the line of code having the breakpoint does not match any of the address fields, the event is simply passed to the debugger.

The method described with reference to FIG. 6-FIG. 9 is repeated until the test sequence is completed or until it is manually terminated by the user. Before the data collection phase is terminated, however, code coverage output data 214 is generated by creating a copy of the enumerated symbols data 210 and adding, for each address, data that indicates whether the address was executed as shown and described with reference to FIG. 5.

It will be understood that the data collected by the code coverage module 206 has been described by way of example and not limitation. Additional data may be collected. For example, the data collection phase may identify whether each module was or was not loaded.

It will also be understood that the code coverage module 206 may be executed multiple times, for example, to run different tests on the software modules. If the code coverage module is executed multiple times, multiple sets of code coverage output data 214 are generated.

The analysis module 208 analyzes the code coverage output data 214 and generates a code coverage report 220. The code coverage report 220 takes any suitable form and may provide any data or summary thereof that may be derived from the code coverage output data 214. For example, the code coverage report 220 typically includes identification of which functions and the percent of code within each function that was executed.

A portion of an example of the code coverage report 220 for a module is provided in Table 1, below.

TABLE 1

| File: d:\xpsprtm\shell\osshell\accesory\notepad\npdate.c | |
|---|---|
| Total: | 23 |
| Hits: | 16 |
| % Total: | 69.57% |
| Functions: | |
| [69.57%] | InsertDateTime |
| File: d:\xpsprtm\shell\osshell\accesory\notepad\npprint.c | |
| Total: | 324 |
| Hits: | 39 |
| % Total: | 12.04% |
| Functions: | |
| [0.00%] | AbortProc |
| [0.00%] | GetResolutions |
| [66.67%] | GetPrinterDCviaDialog |
| [0.00%] | DestroyAbortWnd |
| [47.83%] | PageSetupHookProc |
| [0.00%] | TranslateString |
| [0.00%] | GetPrinterDC |
| [0.00%] | GetNonDefPrinterDC |
| [0.00%] | AbortDlgProc |
| [0.00%] | PintHeaderFooter |
| [0.00%] | NpPrintGivenDC |

TABLE 1-continued

| | |
|---|---|
| [61.54%] | NpPrint |
| [33.33%] | PrintIt |
| Overall: | |
| Total: | 1674 |
| Hits: | 657 |
| % Total: | 39.25% |

More advanced code coverage reports are available. For example, the analysis module 208 may annotate the source code if the source code is available. As a specific example, the code is highlighted, e.g. color coded, to reflect whether the code was executed, not executed, or never loaded.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A method for determining an amount of code executed in a software module, the method comprising:
   enumerating the software module by identifying a plurality of lines of code therein and for each line of code among the plurality of lines of code, generating a baseless address, the baseless address being an address said line of code would reside at if the software module was loaded into a memory beginning at address zero;
   loading the software module;
   replacing at least a portion of an instruction in each of the plurality of lines of code with a breakpoint;
   detecting an attempt to execute at least one of the plurality of lines of code; and
   identifying the one line of code as being hit.

2. The method of claim 1, further comprising: replacing the breakpoint in the one line of code with the portion of the instruction.

3. The method of claim 1, wherein the software module is a binary file.

4. The method of claim 1, further comprising: generating a report that identifies which of the plurality of lines of code were hit while the software module executed.

5. The method of claim 1, wherein the software module includes a plurality of functions, each function having a subset of the plurality of lines of code, further comprising: determining, for each of the plurality of functions, the percentage of the subset of the plurality of lines of code that were hit while the software module executed.

6. The method of claim 1, wherein the instruction is a 64-bit instruction.

7. The method of claim 1, wherein the step of enumerating the software module comprises generating a list that includes the baseless address for each of the plurality of lines of code.

8. The method of claim 7, wherein the list further identifies a source file and function name.

9. The method of claim 1, further comprising: creating a module list that identifies the software module and an address list that identifies the plurality of lines of codes.

10. The method of claim 1, further comprising: creating, for each line of the plurality of lines of code, a code coverage data structure that includes a first field for identifying the breakpoint, a second field for identifying an actual address where the line of code is loaded into memory, a third field for storing the portion of the instruction, and a fourth field for identifying the line of code as hit.

11. A system for determining an amount of code executed in a software module, the system comprising:
   a processor to execute the software module;
   an enumeration module that identifies lines of code in the software module that match criteria and that generates a module list that includes the software module name and a corresponding address list that includes a baseless address for each of the lines of code, each baseless address being an address a corresponding line of code would reside at if the software module was loaded into a memory beginning at address zero; and
   a code coverage module that, upon loading of the software module, modifies each of the lines of code by replacing a portion of an instruction therein with a breakpoint, detects when an attempt is made to execute any one of the lines of code, identifies the one line of code as hit, and restores the line of code by reinserting the portion of the instruction.

12. The system of claim 11, further comprising an analysis module that generates a report comprising statistics concerning the amount of code that was hit while the software module executed.

13. The system of claim 11, wherein the code coverage module creates, for each line of code, a code coverage data structure that includes a first field for identifying the breakpoint, a second field for identifying an actual address where the line of code is loaded into memory, a third field for storing the portion of the instruction, and a fourth field for identifying the line of code as hit.

14. A computer readable storage medium having computer readable instructions for executing a method for determining the amount of code executed in a software module, the method comprising:
   enumerating the software module by identifying a plurality of lines of code therein and for each line of code among the plurality of lines of code, generating a baseless address, the baseless address being an address said line of code would reside at if the software module was loaded into a memory beginning at address zero;
   loading the software module;
   replacing at least a portion of an instruction in each of the plurality of Lines of code with a breakpoint;
   detecting an attempt to execute at least one of the plurality of lines of code;
   identifying the one line of code as being hit; and
   replacing the breakpoint in the one line of code with the portion of the instruction.

15. The computer readable storage medium of claim 14, further comprising: generating a report that identifies which of the plurality of lines of code were hit while the software module executed.

16. The computer readable storage medium of claim 14, wherein the software includes a plurality of functions, each function having a subset of the plurality of lines of code, further comprising: determining, for each of the plurality of functions, the percentage of the subset of the plurality of lines of code That were hit while the software module executed.

17. The computer readable storage medium of claim 14, wherein the step of enumerating the software module comprises generating a list that includes the baseless address for each of the plurality of lines of code.

18. The computer readable storage medium of claim 14, wherein the list further identifies a source file and function name.

19. The computer readable storage medium of method of claim 14, further comprising: creating a module list that identifies the software module and an address list that identifies the plurality of lines of codes.

20. The computer readable storage medium of claim 14, further comprising: creating, for each line of the plurality of lines of code, a code coverage data structure that includes a first field for identifying the breakpoint, a second field for identifying an actual address where the line of code is loaded into memory, a third field for storing the portion of the instruction, and a fourth field for identifying the attempt to execute the line of code.

* * * * *